United States Patent [19]

Wiecko

[11] Patent Number: 4,869,130
[45] Date of Patent: Sep. 26, 1989

[54] WINDER

[76] Inventor: Ryszard Wiecko, 4019 W. Cornelia, Chicago, Ill. 60641

[21] Appl. No.: 24,011

[22] Filed: Mar. 10, 1987

[51] Int. Cl.⁴ ............................................. F16H 37/02
[52] U.S. Cl. ...................................... 74/740; 74/190; 74/785; 254/274
[58] Field of Search ............... 74/194, 198, 740, 691, 74/785, 796, 190.5, 190; 242/54 R, 75.5, 45; 254/274

[56] References Cited

U.S. PATENT DOCUMENTS

| | | | |
|---|---|---|---|
| 2,059,589 | 11/1936 | Leedham | 74/190 |
| 2,086,491 | 6/1937 | Dodge | 74/796 |
| 2,093,815 | 9/1937 | McIlvried et al. | 74/190 |
| 2,446,462 | 8/1948 | Dodge | 74/691 |
| 2,716,357 | 8/1955 | Rennerfelt | 74/691 |
| 2,744,422 | 5/1956 | Finch | 74/785 |
| 2,775,263 | 12/1956 | Rush | 242/75.5 |
| 3,080,029 | 3/1963 | Stober | 74/796 |
| 3,343,761 | 9/1967 | Rotter | 242/75.5 |
| 3,745,844 | 6/1973 | Schottler | 74/198 |
| 3,875,814 | 4/1975 | Steuer | 74/194 |
| 4,098,146 | 6/1978 | McLarty | 74/194 X |
| 4,185,509 | 1/1980 | McLarty | 74/194 X |
| 4,593,574 | 6/1986 | Sinn et al. | 74/796 X |
| 4,649,772 | 3/1987 | Daniel et al. | 74/785 |

FOREIGN PATENT DOCUMENTS

| | | | |
|---|---|---|---|
| 209126 | 10/1959 | Fed. Rep. of Germany | 74/198 |
| 1165372 | 3/1964 | Fed. Rep. of Germany | 74/796 |
| 676777 | 10/1977 | U.S.S.R. | 74/198 |

Primary Examiner—Dwight G. Diehl
Attorney, Agent, or Firm—Willian Brinks Olds Hofer Gilson & Lione

[57] ABSTRACT

A winder for winding and unwinding of materials, which utilizes a ball variator and planetary speed reducer in combination with a mechanism functioning as a regulator of speed output and tension desired for the materials. During a winding operation, the growing winding diameter of the material causes a rise in torque at the winding shaft and through a series of planet pinions, an increase of thrust at the ring gear of the planetary speed reducer. This increase of thrust is followed by rotation of the ring gear and control cam via a control lever. The rotation is transmitted from the control cam, through a clutch mounted on the control shaft and a series of gears to an iris plate of the ball variator and through the control shaft to a weight lever. The rotation of the iris plate causes a tilt of the balls of the variator, determining the drive ratio and output speed variation. The rotation of the weight lever causes tension desired for the material.

5 Claims, 4 Drawing Sheets

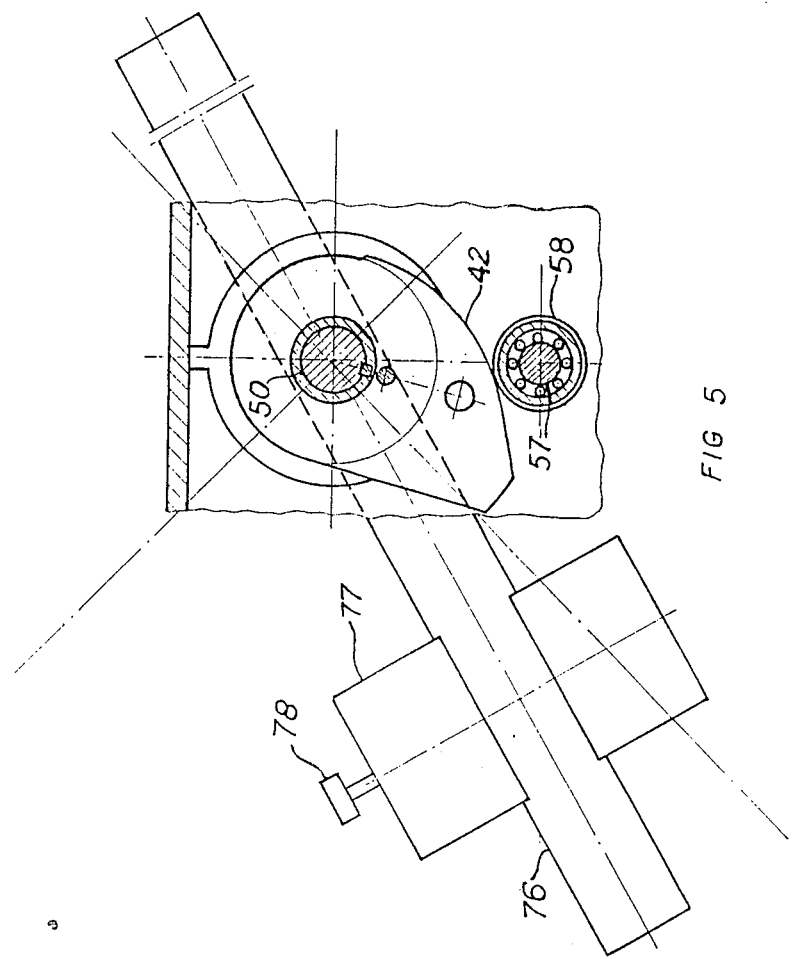
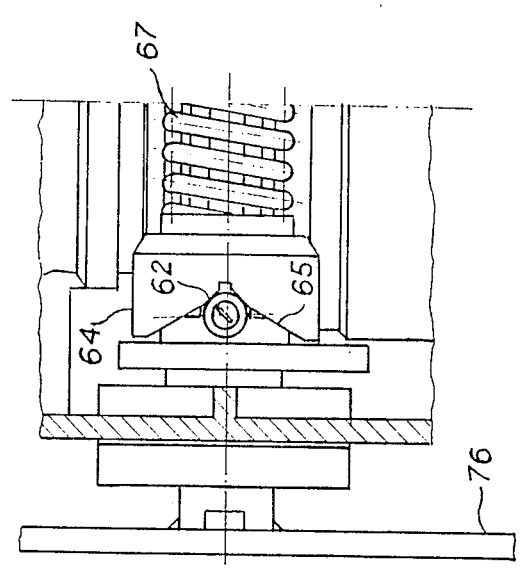

WINDER

FIELD OF INVENTION

The present invention relates to winders with controlled speed at the winding shaft for winding and unwinding of materials dependent on constant or variable tensions.

SUMMARY AND OBJECT OF THE INVENTION

According to the present invention, a process of winding and unwinding of textile materials, carpet yarns, paper, polyethylene foils, wire, plastic threads, and the like, dependent on constant and variable tensions, may be performed by the winder, which utilizes a ball variator and planetary speed reducer in combination with a mechanism functioning as regulator of speed output and tension desired for the material.

As during a winding operation, the growing winding diameter of the material causes a rise in torque at the winding shaft. The winder decreases its output speed automatically. The rise in torque at the winding shaft causes an increase of thrust at the ring gear of the planetary speed reducer. This increase of thrust is followed by rotation of the ring gear and the control cam via a control lever. Thence, the rotation is transmitted from the control cam, through a clutch mounted on the control shaft and series of gears, to an iris plate of the ball variator and through the control shaft to a weight lever. The rotation of the iris plate causes a tilt of the balls of the variator, determining the drive ratio and output speed variation. The rotation of the weight lever causes tension desired for the material.

The advantages of the instant invention are: its simplicity of design, facilitating repairs or replacements of parts and compact construction, suited for limited space, durability, high efficiency, sensitivity, and particular ease in winding and unwinding operations. These advantages are not simultaneously present in any prior winder.

The invention will be more readily understood and other objects and advantages will become apparent from the study of the following portion of this application, the claims and the attached drawings, in which:

BRIEF DESCRIPTION OF THE DRAWINGS

FIG. 4 is a sectional view taken on line 4—4 in FIG. 3.

FIG. 5 is a sectional view taken on line 5—5 in FIG. 3.

Figure 6:
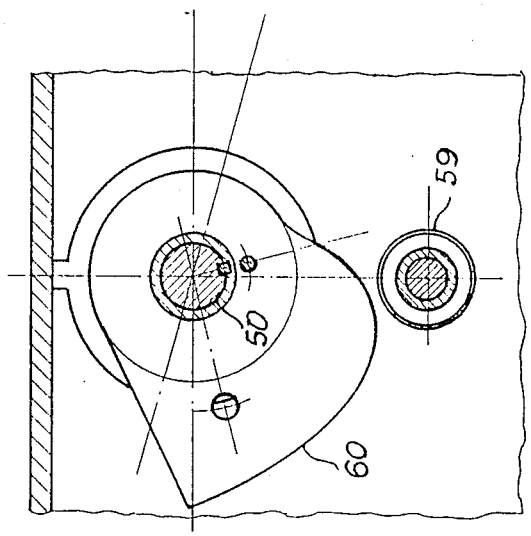
FIG. 6 is a sectional view taken on line 6—6 in FIG. 3.
Figure 1:
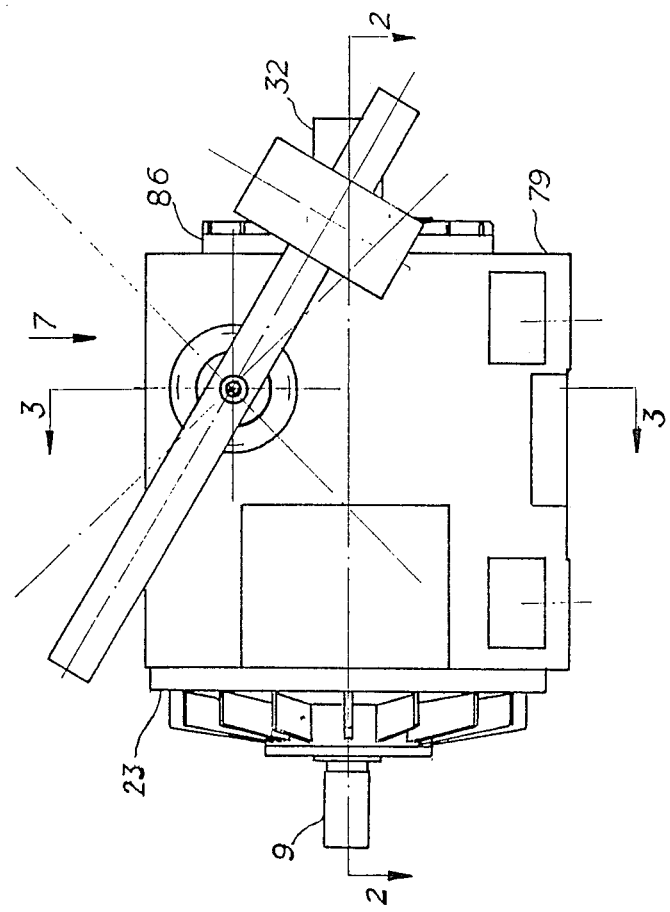
FIG. 1 illustrates a front view of the winder.
Figure 2:
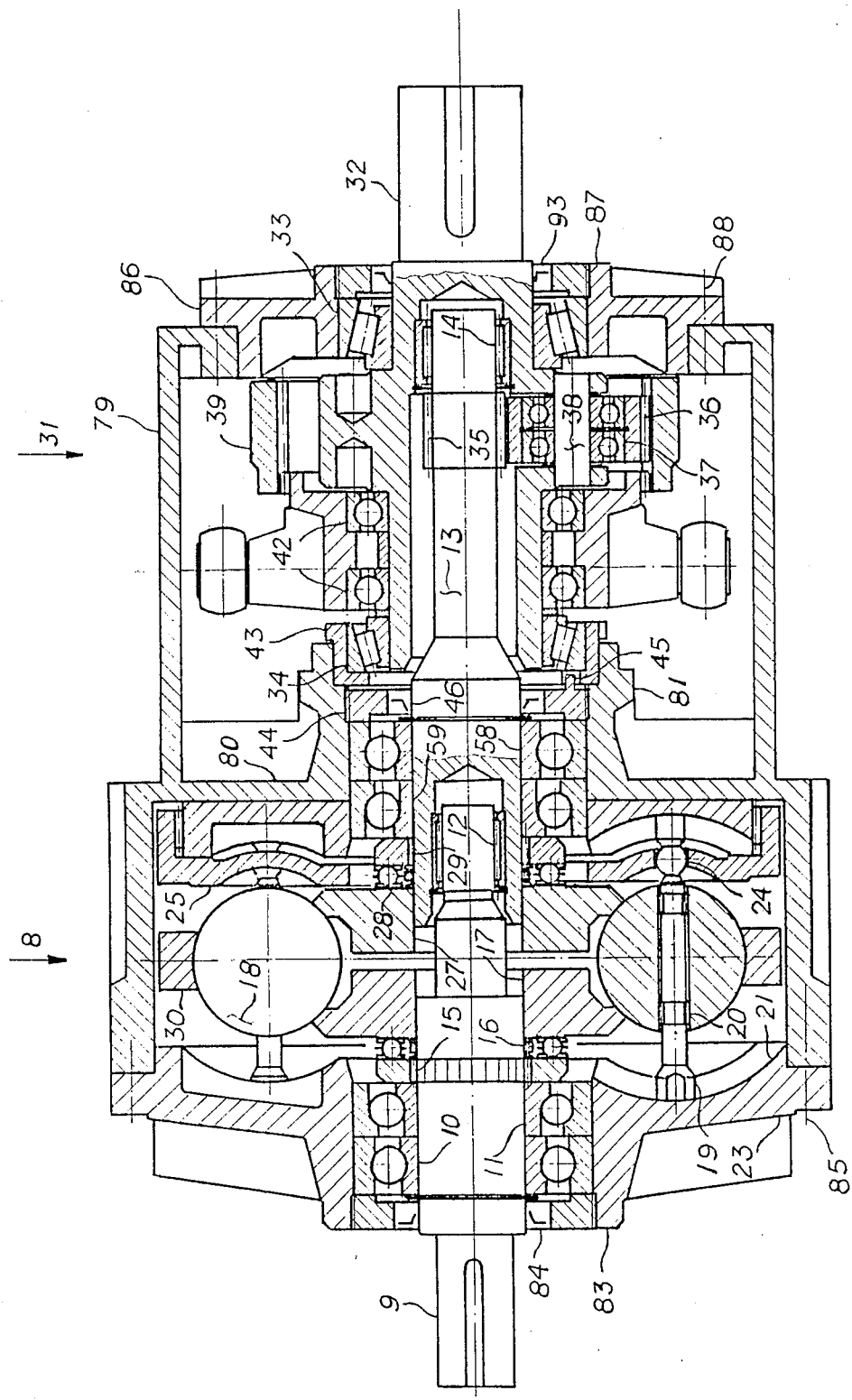
FIG. 2 is a sectional view taken on line 2—2 in FIG. 1.
Figure 3:
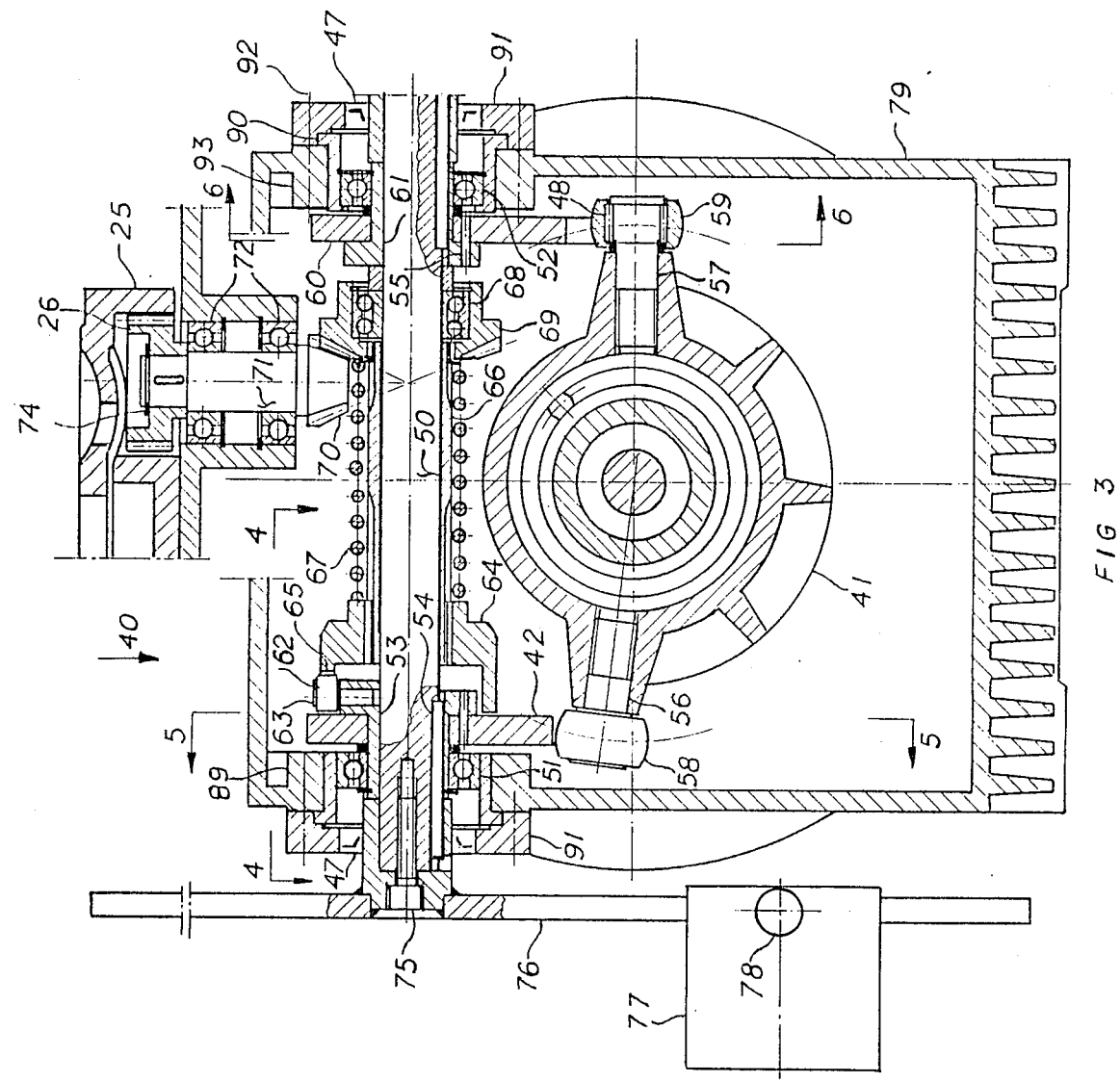
FIG. 3 is a sectional view taken on line 3—3 in FIG. 1 with upper detail shown rotated 90°.

Referring to the drawings, the winder is designated in entirety by 7. It comprises a ball variator 8, having input shaft 9 mounted with one of its ends in bearing assembly 10 and 11, and its male part mounted in female part of shaft 13 in needle bearings assembly 12, coaxial output drive shaft 13 mounted with its female part in bearing assembly 58 and 59, and its male part adjacent to end, formed with sun-gear 35 mounted in needle bearing assembly 14 located in female part of the winding shaft 32. Power is transmitted from the input drive shaft 9 through a disc 15 splined onto the shaft 9. Through the pressure device 16, it passes to the input drive cone 17 and thence to a series of drive balls 18 mounted on ball spindles 19, which incorporates two sets of needle roller bearing assemblies 20. The ball spindles are located at each end in radial slots 21 in the end cover 23 passing through a series of cam shaped slots 24 in an iris plate 25, which can be rotated by the control gear 26. This movement tilts the ball spindles 19 of the drive balls 18 and produces the speed variation. From the drive balls 18, power is transmitted through the output drive cone 27 via a second pressure device 28 to the disc 29, which is splined to the output drive shaft 13. The drive balls 18 are held in position and in contact with the drive cones 17 and 27 by the retaining ring 30.

The winder also comprises a planetary speed reducer 31 having a planet arm or interchangeable winding shaft 32, coaxial with shaft 13, mounted with its male part in bearing assembly 33 and with its female part in bearing assembly 34 located in bearing seat 43. Power is transmitted from the output shaft 13 through sun-gear 35 via planet pinion 36, mounted in bearing assembly 37 secured on the shaft 38, to winding shaft 32. During a winding operation, the growing winding diameter causes the rise of torque at the winding shaft 32. The increase of torque causes an increase of thrust in proportion to the rising torque and is transmitted through planet pinion 36 to the ring gear 39.

Finally, the winder controls speed output and tension desired for the material regulating mechanism 40. Slideably splined in the ring gear 39 and rotatably mounted on bearing assembly 42, is the twin lever 41 having two radially extending, in the plane normal to winding shaft 32, ridgily fixed, shafts 56 and 57. Mounted on the shafts and supported with needle bearings 48, are spherical rollers 58 and 59, respectively. The rollers are aligned with shaft 50 by turning seat 43 together with nut 44, locked to the seat by pin 45 and sealed by the seal ring 46. The increase of the thrust is followed by rotation of the ring gear 39, together with the twin lever 41. During the winding operation via roller 58, the rotation is transmitted to the winding control cam 72, mounted on to the control shaft 50 through sleeve 53 and rigidly secured in place by key 54 and pin 55. During the unwinding operation via roller 59, the rotation is transmitted to the unwinding control cam 60, mounted on the control shaft 50 through sleeve 61 and rigidly secured in place by key 54 and pin 55. Shaft 50 is located in the plane normal to the winding shaft, passing through centers of rollers 58 and 59, and parallel with base plane, mounted with one of its ends in bearing assembly 51 and with its other end in bearing assembly 52. From the shaft 50, rotation is transmitted to clutch disc 64, through roller 62. Roller 62 is rotatably mounted on pin 63, which is rigidly fixed to and radially extending out from sleeve 53. Sleeve 66 is rotatably mounted on shaft 50. Clutch disc 64 is slideably splined on the sleeve 66, and with bottom of its ramp 65 engages, with initial pre-load induced by spring 67, roller 62. Slideably splined onto the other end of sleeve 66 and rotatably mounted on bearing assembly 68, is bevel gear 69, engaging gear 70 mounted on shaft 71, supported by bearing assembly 72, carries, secured in place by retaining ring 74, pinion gear 26, which engages and passes rotation from clutch disc 64 to iris plate 25, producing speed variation. On the end of shaft 50, extending out of one side of the housing, secured by key 54 and screw 75 is the weight lever 76, supporting the slideable weight 77, secured in place by hand screw 78, controlling tension desired for the materials. Housing 79 comprising inner wall 80, formed with bearing seat 81 having first open end to receive input end cover 23 formed with bearing seat 83 and radial grooves 21, secured in place by screws 85, and second open end to receive end cover 86 formed with bearing seat 87, coaxial with seats 81 and 83, secured in place by screws 88. Input shaft 9 and output shaft 32 are sealed by seals 84 and 93, respectively. Finally, on line parallel to base plane and normal to center line of bearing seats 81 and 83, the housing has first and second side wall bearing seat 89 and 93, respectively, to receive bearing sleeve 90, bearing cover 91 secured by screws 92, and sealed by seal 47.

While I have described the invention along specific lines, various minor changes or refinements may be therein without departing its principle, and I reserve the right to employ all such changes and refinements as may come within the scope and spirit of the appended claims.

What I claim as new is:

1. A winder for winding and unwinding of materials, said winder comprising in combination:
    A. a housing member,
    B. a ball variator secured in said housing member, having an input shaft extending out of one end of the housing and coaxial with an elongated output shaft extending toward the opposite end of the housing and fixedly carrying a sun gear at the end near the opposite end of the housing, and an iris plate;
    C. a planetary speed reducer mounted in said housing having planet arm, defined by said winding shaft, and with planet pinions engaging said sun gear of said ball variator,
    D. a mechanism controlling speed output and tension required for materials, mounted in said housing comprising:
        a control twin lever slideably splined in the ring gear and rotatably mounted in said planet arm, comprising radially extending shafts, and rollers, which engage corresponding control cams,
        a control cam, including a sliding weight,
        a control shaft, rotatably mounted in said housing with one of its ends extending out of one side of the housing to receive control arm,
        a cam for controlling a process of winding, rigidly mounted onto said control shaft, to engage a corresponding roller of said twin lever,
        a cam for controlling a process of unwinding, rigidly mounted onto said control shaft, to engage corresponding roller of said twin lever,
    E. a clutch, comprising,
        a roller rotatably mounted on a radially extending out pin and rigidly mounted onto said control shaft, engaging,
        a clutch disc, slideably splined onto the one end of a sleeve, at the bottom of its ramps, and
        a spring to induce initial preload on said clutch disc, wound on said sleeve which carries at its other end an angle gear drive which includes a shaft extending out carrying pinion which engages said iris plate.

2. The winder of claim 1 wherein the two cams have identical cam curves regulating the winding and unwinding processes respectively.

3. The winder of claim 2 wherein said clutch means includes a roller radially mounted on said control shaft; a sleeve disposed about said control shaft; a clutch disc slideably mounted to one end of said sleeve to engage said radially mounted roller; a spring disposed about said sleeve to indice a preload on said clutch plate; an angle gear drive fixedly attached to the other end of said sleeve, said angle gear drive including a shaft and pinion gear means for transmitting rotating motion from said angle gear drive shaft to said iris plate.

4. The winder of claim 2 wherein the two cams have identical cam curves regulating the winding and unwinding process respectively.

5. A winder for winding and unwinding of materials, said winder comprising:
    a housing member;
    a ball variator secured in said housing member, said ball variator including an input shaft extending out of one end of said housing, an output shaft coaxial with said input shaft and extending toward the opposite end of said housing, a series of balls rotatably mounted on spindles, a input plate operatively connected to said input shaft and said balls such that rotation of said input shaft causes rotation of said balls; and output drive cone fixedly attached to said output shaft and engaging said balls; and iris plate including a cammed slot which receives one end of said spindles such that rotation of said iris plate causes speed variation between said input shaft and said output shaft;
    a control mechanism for controlling the speed and tension of said winder, said control mechanism including a control lever comprising two radially extending shafts, each radially extending shaft including a roller in the end thereof, said control lever rotataby mounted on said output shaft; speed reducer gear means for transmitting reduced rotating motion from said output shaft to said control lever; a control shaft rotatably mounted in said housing with one of its ends extending out of one side of said housing; a pair of cams, one for controlling a winding process and one for controlling a unwinding process, each of said cams rigidly mounted to said control shaft and each of said cams disposed to engage a corresponding roller of said control lever; a control arm including a sliding weight, said control arm received in the end of said control shaft which extends out of said housing;
    clutch means including drive means for transmitting rotating motion from said cams to said iris plate to cause rotation of said iris plate.

* * * * *

UNITED STATES PATENT AND TRADEMARK OFFICE
CERTIFICATE OF CORRECTION

PATENT NO. : 4,869,130
DATED : Sept. 26, 1989
INVENTOR(S) : Ryszard Wiecko

It is certified that error appears in the above-identified patent and that said Letters Patent is hereby corrected as shown below:

In claim 1, column 3, line 44, please delete "cam" and substitute therefor --arm--.

In claim 3, column 4, line 14, please delete "indice" and substitute therefor --induce--.

Signed and Sealed this

Twenty-fifth Day of February, 1992

Attest:

HARRY F. MANBECK, JR.

*Attesting Officer*  *Commissioner of Patents and Trademarks*